US005431752A

United States Patent [19]

Brogle et al.

[11] Patent Number: 5,431,752

[45] Date of Patent: Jul. 11, 1995

[54] FRICTION WELDING OF γ TITANIUM ALUMINIDE TO STEEL BODY WITH NICKEL ALLOY CONNECTING PIECE THERE BETWEEN

[75] Inventors: Erwin Brogle, Klettgau, Germany; Markus Staubli, Dottikon; Mohammed Y. Nazmy, Fislisbach, both of Switzerland; Dieter Gausmann, Sendenhorst, Germany

[73] Assignee: Asea Brown Boveri Ltd., Baden, Switzerland

[21] Appl. No.: 150,888

[22] Filed: Nov. 12, 1993

[51] Int. Cl.[6] .......... F02B 39/00

[52] U.S. Cl. .......... 148/516; 148/421

[58] Field of Search .......... 148/516, 421

[56] References Cited

U.S. PATENT DOCUMENTS

| | | | |
|---|---|---|---|
| 4,964,564 | 10/1990 | Neal et al. | 228/107 |
| 5,111,570 | 5/1992 | Baumgarten et al. | 29/402 |
| 5,262,123 | 11/1993 | Thomas et al. | 419/67 |

FOREIGN PATENT DOCUMENTS

| | | |
|---|---|---|
| 0368642A2 | 5/1990 | European Pat. Off. . |
| 2078734 | 3/1990 | Japan . |
| 2157403 | 6/1990 | Japan . |
| 2160187 | 6/1990 | Japan . |
| 2160188 | 6/1990 | Japan . |

OTHER PUBLICATIONS

Nishiyama et al, 1987 Tokyo International Gas Turbine Congress, Oct. 1987, III-263.

Superalloys (ed.) E. F. Bradley ASM, 1988, pp. 33-37, 218-220.

High Temperature Aluminides and Intermetallics, S. H. Whang, et al., editors, 1990, pp. 574-577.

*Primary Examiner*—Upendra Roy

*Attorney, Agent, or Firm*—Burns, Doane, Swecker & Mathis

[57] ABSTRACT

The component comprises a body (5) composed of an alloy based on a γ-titanium aluminide, a steel body (2) and a connecting piece (4) composed of a nickel-base alloy. The γ-titanium aluminide body (5) and the steel body (2) are rigidly joined together by means of the connecting piece (4). The joint between the γ-titanium aluminide body (5) and the connecting piece (4) is produced by friction welding. The nickel-base alloy has a nickel content of less than 65 percent by weight. This achieves the result that the friction-welding joint of the γ-titanium aluminide body (5) to the connecting piece (4) can be produced at comparatively low temperatures. During the friction welding, the risk of crack formations in the embrittlement-prone γ-titanium aluminide body (5) is therefore appreciably reduced.

20 Claims, 1 Drawing Sheet

1 6 7 8 5 3 2 4

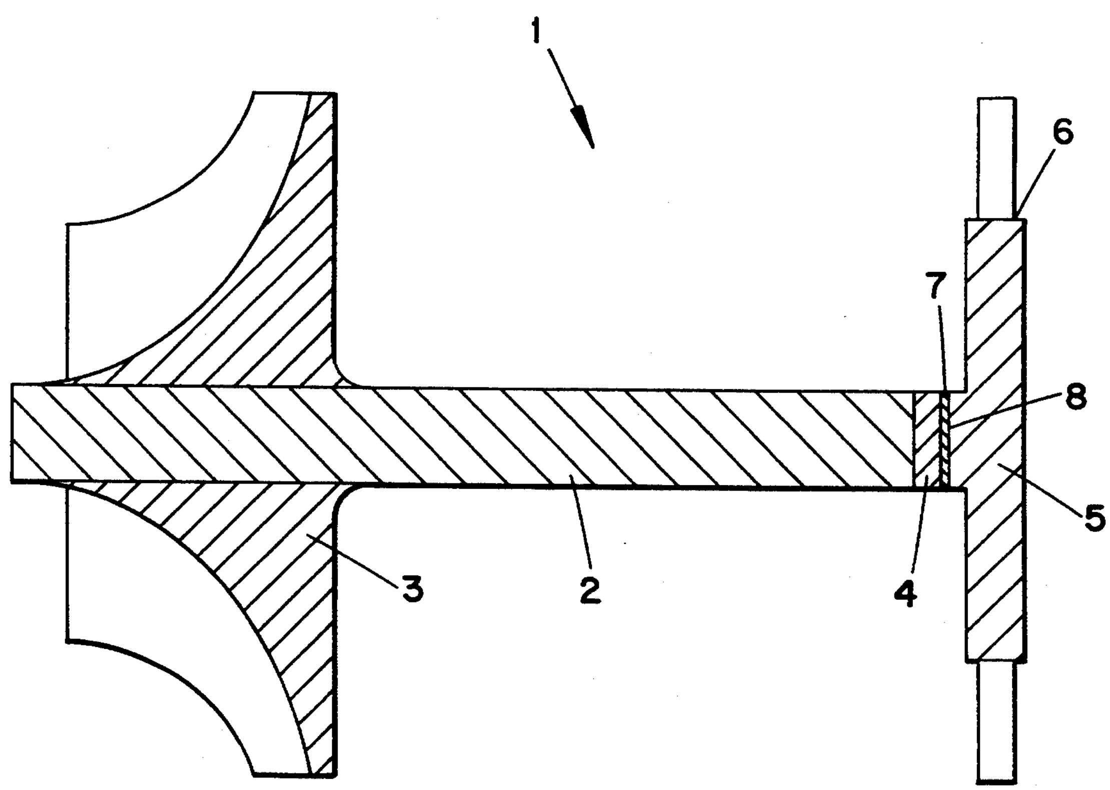
1
6
7
8
5
3
2
4

FRICTION WELDING OF γ TITANIUM ALUMINIDE TO STEEL BODY WITH NICKEL ALLOY CONNECTING PIECE THERE BETWEEN

BACKGROUND OF THE INVENTION

1. Field of the Invention

The invention proceeds from a component comprising a body composed of an alloy based on a γ-titanium aluminide, a steel body and a connecting piece composed of a nickel-base alloy, by means of which connecting piece the γ-titanium aluminide body and the steel body are rigidly joined together, the joint between the γ-titanium aluminide body and the connecting piece being produced by friction welding. The invention also relates to a process for producing said component.

2. Discussion of Background

A component of the type mentioned at the outset and formed as rotor of a turbocharger and a process for producing said rotor have already been described by Y. Nishiyama et al., "Development of Titanium Aluminide Turbocharger Rotors", High Temperature Aluminides and Intermetallics, edited by S. H. Whang et al., The Minerals, Metals & Materials Society, 1990. The predisclosed rotor comprises a turbine wheel composed of a γ-titanium aluminide and joined to a steel shaft by friction welding by means of a connecting piece composed of a nickel-based alloy having a nickel content of over 70 percent by weight. Such a rotor is notable for a shear strength which is determined by the γ-titanium aluminide since the nickel-based alloy acts as a buffer and brittle phases which occur in the direct friction welding of γ-titanium aluminide and steel are avoided as a result of the formation of a continuous diffusion layer at the joint between the γ-titanium aluminide body and the connecting piece. High-alloy nickel-based alloys have a melting range situated at comparatively high temperatures. To activate the diffusion processes occurring during friction welding, a comparatively high energy is needed in the case of this alloy.

SUMMARY OF THE INVENTION

Accordingly, one object of the invention is to provide a novel component of the type mentioned at the outset, which, despite high mechanical strength, is simple to produce, and at the same time to provide a process, with the aid of which said component can be produced in an inexpensive manner.

The component according to the invention is notable for high mechanical strength both at room temperature and also at temperatures of up to 700° C. This is a consequence of the suitably chosen material of the connecting piece. A comparatively low nickel content achieves the result that the friction-welding joint of the γ-titanium aluminide body to the connecting piece can be produced at comparatively low temperatures, with the result that the risk of crack formation in the embrittlement-prone γ-titanium aluminide body is appreciably reduced during friction welding. To be preferred are connecting pieces having a comparatively large proportion of iron, which promotes friction welding at low temperatures.

The process according to the invention provided for producing the component according to the invention is notable for the fact that it has a comparatively low energy requirement and provides embrittlement-free components even if the process parameters provided in the carrying-out of the process vary appreciably. It is therefore eminently suitable for mass production.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the sole figure shows a plan view of a section made axially through a component according to the invention which is formed as rotor of a turbocharger.

DESCRIPTION OF THE PREFERRED EMBODIMENT

Referring now to the drawing, in the figure, 1 denotes a rotor of a turbocharger with a cylindrical steel body 2 which is used as shaft of the turbocharger and whose one end supports a compressor wheel 3 composed, for example, of an aluminum alloy and whose other end is rigidly joined to a γ-titanium aluminide body 5 by means of a connecting piece 4. Said γ-titanium aluminide body 5 is at least a part of a turbine wheel 6 of the turbocharger, which turbine wheel 6 is exposed to the exhaust gas of an internal combustion engine. The reference symbol 7 denotes a diffusion layer which effects the rigid joint between the connecting piece 4 and the γ-titanium aluminide body 5.

The steel body 2 has a length of, for example, 200 mm and a diameter of, for example, 45 mm. It may be composed of a low-alloy steel, for example a quenched and tempered steel having a carbon content of approximately 0.4 percent by weight, a chromium content of approximately 1 percent by weight and a comparatively low molybdenum content.

The connecting piece 4 is formed as a disc having a diameter, matched to the steel body 2, of, for example, also 45 mm and a thickness, promoting the buffer action between the steel body 2 and the γ-titanium aluminide body 5, of, for example, 10 to 30 mm and is composed of a nickel-base alloy having a nickel content of less than 65 percent by weight. Such an alloy can be joined both to the steel body 2 and to the γ-titanium aluminide body 5 by welding without a break-up of the welding points or an embrittlement fracture of the rotor 1, especially in the region of the γ-titanium aluminide body 5, which is comparatively brittle compared with steel and the nickel-base alloy, having to be feared under high mechanical and thermal loadings during the operation of the turbocharger. Especially to be preferred is a nickel-base alloy having an iron content of between 10 and 30, preferably between 15 and 25 percent by weight, which alloy, at the same time as having good mechanical properties, also has a comparatively low melting range which especially promotes the welding process at low temperatures. A niobium content of 3 to 7 percent by weight additionally increases the mechanical properties of the welding points. A nickel-base alloy having the following composition has proved particularly advantageous:

| | |
|---|---|
| 18–20 | percent by weight of chromium, |
| 18–22 | percent by weight of iron, |
| 2–4 | percent by weight of molybdenum, |
| 4–6 | percent by weight of niobium, |
| up to 1 | percent by weight of aluminum, |
| up to 2 | percent by weight of titanium, |

-continued

| | |
|---|---|
| up to 0.4 | percent by weight of silicon, |
| up to 0.4 | percent by weight of manganese. |
| up to 0.05 | percent by weight of carbon, |
| the rest being unavoidable impurities and nickel. | |

Such an alloy is, for example, a nickel-base alloy marketed under the designation INCONEL 718 by the INCO company.

The γ-titanium aluminide body 5 has a cylindrical shoulder 8, matched to the connecting piece 4, of, for example, also 45 mm diameter and is formed from an intermetallic compound based on a doped γ-titanium aluminide. To be preferred as dopant in this connection are, in particular, boron or silicon, and also at least one metallic dopant in addition, such as in particular chromium, hafnium, manganese, molybdenum, niobium, tantalum, vanadium and/or tungsten. Particularly good mechanical properties can be achieved with a γ-titanium aluminide having an aluminum content of approximately 28 to 33 percent by weight, a tungsten content of 5 to 15 percent by weight, a silicon content of 0.3 to 3 percent by weight, the rest being unavoidable impurities and titanium.

The rotor 1 was produced from the individual components as follows: First the connecting piece 4 was joined to the steel body 2 in a friction-welding operation which was carried out in a routine manner. Then the γ-titanium aluminide body 5 was joined to the body formed from the connecting piece 4 and the steel body 2. In doing this, special care was taken that the γ-titanium aluminide body 5 and the connecting piece 4 rested flatly on top of one another in the direction of the common axis of the steel body 2 and the γ-titanium aluminide body 5. After adequate alignment of the connecting piece 4 welded onto the steel body 2 and of the γ-titanium aluminide body 5, these two parts were rigidly joined to one another by friction welding. For this purpose, the steel body 2 and, consequently, the connecting piece 4, and the γ-titanium aluminide body 5 were rotated against one another on a friction-welding machine at a rotary speed of, for example, 500 revolutions per minute with a rubbing pressure which did not exceed a specified first limit value. In this process, the energy sufficient for the subsequent welding operation was introduced into the welding point. The γ-titanium aluminide body 5 and the connecting piece 4 were then subsequently welded together at relative rest with respect to one another under an upsetting pressure, which did not exceed a second limit value which was higher than the first limit value, to form the diffusion layer 7. The diffusion layer 7 predominantly formed in a thickness of up to 100 μm on that side of the connecting piece 4 which rests on the γ-titanium aluminide body 5 and contained, in particular, titanium and aluminum, but also the additional dopants contained in the γ-titanium aluminide body. It is of special advantage in this connection that, because of the comparatively low-melting material of the connecting piece 4, the friction welding was carried out after only a comparatively short time and under mild conditions for the relatively brittle γ-titanium aluminide body 5.

Embrittlements and crack formations in the γ-titanium aluminide body 5 were avoided by suitable choice of the time, the rotary speed and the rubbing pressure during the rubbing operation, and also by suitable dimensioning of the upsetting pressure during the welding operation. Especially beneficial results were achieved with comparatively short manufacturing times if the rubbing pressure during the rubbing operation reached approximately 200 $N/mm^2$ and the upsetting pressure during the welding operation reached approximately 300 $N/mm^2$ with the bodies at rest.

It has proved especially beneficial to increase the rubbing pressure in the rubbing operation during the rotation of the γ-titanium aluminide body 5 and the connecting piece 4 against one another in steps up to the first limit value since it was then possible to weld in an especially material-protecting manner. In this process, the rubbing pressure was up to 150 $N/mm^2$ in a first step.

The rubbing time in the first step was not more than 60 s, preferably 40 s. The total rubbing time was not more than 120 s, preferably 60 to 80 s.

After manufacture, the friction-welded rotor 1 was heated to approximately 600° C. at a rate of approximately 150° C. per hour, kept at this temperature for a few hours and then cooled at a rate of approximately 50° C. per hour. This eliminated stress states which may have arisen in the steel body 2 during friction welding and result in an embrittlement.

Strength values determined on the basis of tensile tests for components formed and produced in such a manner were predominantly approximately 500 MPa at room temperature, and the destruction occurred either at the diffusion layer 7 or at the γ-titanium aluminide body 5. These high strength values are completely adequate for numerous applications of the component according to the invention, such as in particular as a turbocharger rotor.

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing a component comprising a body composed of an alloy based on a gamma-titanium aluminide, a steel body and a connecting piece composed of a nickel-base alloy, by means of which connecting piece the gamma-titanium aluminide body and the steel body are rigidly joined to one another, the joint between the gamma-titanium aluminide body and the connecting piece being produced by friction welding, the method comprising steps of:

selecting a nickel-base alloy containing less than 65 percent by weight of nickel, less than 30 percent by weight of iron and 3 to 7 percent by weight of niobium;

first rotating the gamma-titanium aluminide body and the connecting piece against one another during friction welding under a rubbing pressure which does not exceed a first limit value, and subsequently welding the gamma-titanium aluminide body and the connecting piece together at relative rest with respect to one another under an upsetting pressure, which does not exceed a second limit value which is higher than the first limit value, to form a diffusion layer containing at least titanium and aluminum.

2. The process as claimed in claim 1, wherein the nickel-base alloy contains between 10 and 30 percent by weight of iron.

3. The process as claimed in claim 1, wherein the connecting piece spaces the gamma-titanium aluminide body and the steel body apart by approximately 10 to 30 mm.

4. The process as claimed in claim 1, wherein the component is the rotor of a turbocharger wherein the gamma-titanium aluminide body comprises a turbine wheel of the rotor and the steel body comprises a shaft of the rotor.

5. The process as claimed in claim 1, wherein the rubbing pressure during the rotation of the gamma-titanium aluminide body and the connecting piece against one another is increased in steps up to the first limit value.

6. The process as claimed in claim 1, wherein the first limit value is approximately 200 $N/mm^2$.

7. The process as claimed in claim 1, further comprising friction welding the steel body to the connecting piece prior to the friction welding of the gamma-titanium aluminide body to the connecting piece.

8. The process as claimed in claim 1, wherein the component is heated to approximately 600° C. for at least 1 hour.

9. The process as claimed in claim 2, wherein the nickel-base alloy contains between 15 and 25 percent by weight of iron.

10. The process as claimed in claim 5, wherein the rubbing pressure in a first step is up to 150 $N/mm^2$.

11. The process as claimed in claim 10, wherein the rubbing time in the first step is not more than 60 s and the total rubbing time is not more than 120 s.

12. A process for producing a component comprising a body composed of an alloy based on a gamma-titanium aluminide, a steel body and a connecting piece composed of a nickel-base alloy, by means of which connecting piece the gamma-titanium aluminide body and the steel body are rigidly joined to one another, the joint between the gamma-titanium aluminide body and the connecting piece being produced by friction welding, the method comprising steps of:

selecting a nickel-base alloy containing

| | |
|---|---|
| 18–20 | percent by weight of chromium, |
| 18–22 | percent by weight of iron, |
| 2–4 | percent by weight of molybdenum, |
| 4–6 | percent by weight of niobium, |
| up to 1 | percent by weight of aluminum, |
| up to 2 | percent by weight of titanium, |
| up to 0.4 | percent by weight of silicon, |
| up to 0.4 | percent by weight of manganese, |
| up to 0.05 | percent by weight of carbon, and |
| unavoidable impurities and nickel as the remainder; | |

first rotating the gamma-titanium aluminide body and the connecting piece against one another during friction welding under a rubbing pressure which does not exceed a first limit value, and subsequently welding the gamma-titanium aluminide body and the connecting piece together at relative rest with respect to one another under an upsetting pressure, which does not exceed a second limit value which is higher than the first limit value, to form a diffusion layer containing at least titanium and aluminum.

13. The process as claimed in claim 12, wherein the connecting piece spaces the gamma-titanium aluminide body and the steel body apart by approximately 10 to 30 mm.

14. The process as claimed in claim 12, wherein the component is the rotor of a turbocharger wherein the gamma-titanium aluminide body comprises a turbine wheel of the rotor and the steel body comprises a shaft of the rotor.

15. The process as claimed in claim 12, wherein the rubbing pressure during the rotation of the gamma-titanium aluminide body and the connecting piece against one another is increased in steps up to the first limit value.

16. The process as claimed in claim 12, wherein the first limit value is approximately 200 $N/mm^2$.

17. The process as claimed in claim 12, further comprising friction welding the steel body to the connecting piece prior to the friction welding of the gamma-titanium aluminide body to the connecting piece.

18. The process as claimed in claim 12, wherein the component is heated to approximately 600° C. for at least 1 hour.

19. The process as claimed in claim 15, wherein the rubbing pressure in a first step is up to 150 $N/mm^2$.

20. The process as claimed in claim 19, wherein the rubbing time in the first step is not more than 60 s and the total rubbing time is not more than 120 s.

* * * * *